(12) United States Patent
Vuillemot

(10) Patent No.: US 11,612,463 B2
(45) Date of Patent: *Mar. 28, 2023

(54) APPARATUS FOR IN SITU RESTORATION OF UNCONSTRAINED DENTAL STRUCTURE

(71) Applicant: William C. Vuillemot, DeWitt, MI (US)

(72) Inventor: William C. Vuillemot, DeWitt, MI (US)

(*) Notice: Subject to any disclaimer, the term of this patent is extended or adjusted under 35 U.S.C. 154(b) by 220 days.

This patent is subject to a terminal disclaimer.

(21) Appl. No.: 17/014,517

(22) Filed: Sep. 8, 2020

(65) Prior Publication Data

US 2020/0397541 A1 Dec. 24, 2020

(51) Int. Cl.
  *A61C 13/00* (2006.01)
  *A61C 13/107* (2006.01)
  *A61C 9/00* (2006.01)

(52) U.S. Cl.
  CPC ........ *A61C 13/0004* (2013.01); *A61C 9/0053* (2013.01); *A61C 13/0001* (2013.01); *A61C 13/0019* (2013.01); *A61C 13/0013* (2013.01)

(58) Field of Classification Search
  CPC ............ A61C 13/0004; A61C 13/0001; A61C 13/0019; A61C 13/0013; A61C 9/0053
  USPC ......................................................... 433/226
  See application file for complete search history.

(56) References Cited

U.S. PATENT DOCUMENTS

| | | |
|---|---|---|
| 3,987,545 A * | 10/1976 | Kennedy ................ A61C 13/00 433/48 |
| 4,129,946 A | 12/1978 | Kennedy |
| 4,368,040 A | 1/1983 | Weissman |
| 4,370,133 A | 1/1983 | Stempel |
| 4,457,713 A | 7/1984 | Schneider |
| 4,459,107 A | 7/1984 | Weissman |
| 4,695,254 A | 9/1987 | Herrell |
| 4,767,330 A | 8/1988 | Burger |
| 5,224,049 A | 6/1993 | Mushabac |
| 5,347,454 A | 9/1994 | Mushabac |
| 6,261,098 B1 | 7/2001 | Persson |
| 6,299,449 B1 | 10/2001 | Carlson |
| 6,488,638 B2 | 12/2002 | Mushabac |
| 7,153,135 B1 | 12/2006 | Thomas |
| 7,217,131 B2 | 5/2007 | Vuillemot |
| 7,536,234 B2 | 5/2009 | Kopelman et al. |
| 8,366,445 B2 | 2/2013 | Vuillemot |
| 8,623,026 B2 | 1/2014 | Wong et al. |
| 8,696,356 B2 | 4/2014 | Hegyi et al. |
| 8,702,716 B1 | 4/2014 | Stein et al. |
| 8,813,364 B2 | 8/2014 | Schechner et al. |
| 8,867,800 B2 | 10/2014 | Bullis et al. |

(Continued)

*Primary Examiner* — Matthew M Nelson
(74) *Attorney, Agent, or Firm* — Harness, Dickey & Pierce, P.L.C.

(57) ABSTRACT

A dental restoration apparatus that eliminates time-consuming, labor-intensive steps conventionally needed to fabricate molds, and thereby facilitates dental restorations in a shorter time, while reducing the discomfort and embarrassment sometimes associated with provisional restorations, which includes an additive manufacturing apparatus (e.g., a 3-D printer) having a tool head (e.g., a print head) and a fixture for controlling the position of the tool head relative to the teeth of a patient, allowing fabrication of a planned dental structure directly on an existing dental structure.

18 Claims, 5 Drawing Sheets

(56) References Cited

U.S. PATENT DOCUMENTS

| | | | |
|---|---|---|---|
| 8,985,540 B1 | 3/2015 | Slesinski | |
| 9,107,723 B2 | 8/2015 | Hall | |
| 10,016,242 B2* | 7/2018 | Salcedo | A61C 9/0006 |
| 2002/0006217 A1 | 1/2002 | Rubbert et al. | |
| 2002/0015934 A1 | 2/2002 | Rubbert et al. | |
| 2004/0152051 A1 | 8/2004 | Craig | |
| 2005/0023710 A1 | 2/2005 | Brodkin | |
| 2006/0003284 A1 | 1/2006 | Sale et al. | |
| 2006/0008777 A1 | 1/2006 | Peterson et al. | |
| 2006/0063979 A1 | 3/2006 | Rosenblood et al. | |
| 2007/0118243 A1 | 5/2007 | Schroeder et al. | |
| 2008/0044796 A1 | 2/2008 | Hsu | |
| 2009/0025638 A1* | 1/2009 | Inoue | A61C 13/0013 118/712 |
| 2009/0130449 A1 | 5/2009 | El-Siblani | |
| 2009/0222014 A1 | 9/2009 | Bojarski et al. | |
| 2010/0003619 A1 | 1/2010 | Das | |
| 2010/0233655 A1 | 9/2010 | Karim | |
| 2010/0260924 A1 | 10/2010 | Karim | |
| 2010/0310786 A1* | 12/2010 | Dunne | A61C 13/0018 427/595 |
| 2010/0332248 A1 | 12/2010 | Pettersson | |
| 2011/0086328 A1 | 4/2011 | Wedeking | |
| 2011/0171604 A1 | 7/2011 | Durbin et al. | |
| 2011/0212420 A1 | 9/2011 | Vuillemot | |
| 2012/0315600 A1 | 12/2012 | Perler | |
| 2013/0015596 A1* | 1/2013 | Mozeika | B29C 64/232 425/113 |
| 2013/0130202 A1 | 5/2013 | Vuillemot | |
| 2014/0170591 A1 | 6/2014 | El-Siblani | |
| 2014/0319713 A1 | 10/2014 | Blaisdell | |
| 2015/0140517 A1 | 5/2015 | Vuillemot | |
| 2015/0216732 A1 | 8/2015 | Hartwell et al. | |
| 2015/0245886 A1 | 9/2015 | Hegland | |
| 2016/0143716 A1 | 5/2016 | Beyer | |
| 2016/0143717 A1 | 5/2016 | Samrano | |
| 2016/0157967 A1 | 6/2016 | Kim | |
| 2016/0221262 A1* | 8/2016 | Das | G03F 7/70416 |
| 2016/0288414 A1 | 10/2016 | Ozbolat | |
| 2017/0035538 A1* | 2/2017 | Savic | A61C 13/1016 |
| 2017/0143831 A1* | 5/2017 | Varanasi | B29C 64/118 |
| 2017/0173871 A1 | 6/2017 | Emoshkin | |
| 2018/0021113 A1 | 1/2018 | Hansen | |
| 2018/0085202 A1 | 3/2018 | Kopelman | |
| 2018/0200034 A1 | 7/2018 | Deville | |
| 2020/0001540 A1* | 1/2020 | McAlpine | B29C 64/393 |

* cited by examiner

APPARATUS FOR IN SITU RESTORATION OF UNCONSTRAINED DENTAL STRUCTURE

CROSS-REFERENCE TO RELATED APPLICATIONS

Not Applicable.

FIELD OF THE DISCLOSURE

This disclosure relates generally to the field of dental restoration, and more particularly to advanced in-situ dental restoration methods and apparatuses.

BACKGROUND OF THE DISCLOSURE

Typically, in-situ dental restorations are limited to preparing existing dental structure for receiving a dental prosthetic, such as an inlay, onlay, crown, bridge or veneer that is prepared outside of the subjects mouth from a dental impression of the prepared existing dental structure. The conventional process involves preparing the dental structure for a prosthetic, obtaining an impression of the existing dental structure that has been prepared for receiving a prosthetic, providing a temporary or provisional restoration, preparing a prosthetic from the impression, removing the temporary restoration, installing the prosthetic, and optionally making minor adjustments to the restored structure during the installation step. There are certain disadvantages associated with these conventional dental restoration techniques. Most notably, the subject is usually required to visit the dentist at least twice, and endure an often unsightly and sometimes uncomfortable temporary restoration for several days or even weeks.

Advanced dental restoration techniques involving only a single visit have been developed. For example, the Chairside Economical Restoration of Esthetic Ceramics (CEREC) dental restoration technique allows a dental practitioner to use three-dimensional photography, along with computer-aided design (CAD) and computer-aided manufacturing (CAM). In this technique, an optical or virtual impression of the dental structure that has been prepared for receiving a restoration is generated using a digital camera that generates image data that is subsequently processed and manipulated such as by using biogeneric comparisons to develop a three-dimensional virtual model of the restoration. The restoration can be manufactured by milling a solid block of ceramic material using diamond burs. The completed restoration is then bonded to the existing dental structure using a resin cement. The entire process can be completed in a single visit in many cases involving a simple restoration. Even relatively complex restorations can often be completed within the same day or on two consecutive days.

My U.S. Pat. No. 7,217,131 describes an in-situ dental restoration method and kit in which a dental restoration or prosthesis is formed within a subject's mouth by preparing selected dental structure for application of a restoration, fitting a mold over the teeth that are to be restored, the mold defining a space that is filled with a fluid, curable composition, curing the composition, and removing the mold to provide a restored dental structure. The disclosed process can involve preparation of a waxed-up model of a planned restoration of the existing teeth and preparation of a mold from the waxed-up model. These steps generally involve a substantial amount of hands-on manipulations by a dentist or a dental laboratory technician, and cannot typically be completed in a single visit or even on the same day.

My U.S. Pat. No. 8,366,445 describes an improved in-situ dental restoration method in which a camera is used to obtain digital images of an existing dental structure to generate a first three-dimensional digital model of existing dental structure that is modified to generate a second three-dimensional digital model of a planned structure. A dental mold is prepared corresponding to the specifications of the second digital model. The mold is fitted over the existing dental structure to be restored, and a void volume defined between the existing dental structure and the internal walls of the mold is filled with a liquid, curable composition that is subsequently cured. The mold is then removed to provide a restored dental structure. This process eliminates the need for a waxed-up model. However, the process still requires preparation of a mold, and usually involves substantial time and labor, such that the entire process cannot usually be completed in a single visit or on consecutive days.

SUMMARY OF THE INVENTION

This disclosure provides an in-situ dental restoration apparatus that eliminates the need for a mold, eliminating time consuming labor intensive steps needed to fabricate a mold, and thereby allowing a complete dental restoration over a shorter time period, often a single visit, a single day or two successive days. This very substantially reduces the amount of discomfort and embarrassment caused to the dental restoration patient by a temporary restoration, which generally lacks esthetic perfection and often does not fit well onto the existing dental structure.

In certain aspects, the apparatus includes an additive manufacturing device having a tool head for forming a three-dimensional solid structure corresponding with a planned restoration, and a fixture for controlling the position of the tool head relative to the teeth of a patient.

In certain aspects, the apparatus includes a sensor configured to detect a position and orientation of the unconstrained dental structure, and a controller configured to determine trajectory of unconstrained dental structure, and compensate for movement during the restoration.

DESCRIPTION OF THE DISCLOSED EMBODIMENTS

The methods and apparatuses disclosed herein differ significantly from conventional methods and apparatuses used for dental restoration. Rather than using in-situ molding techniques or preparing dental prosthesis, the disclosed processes and apparatuses facilitate a restoration in which the artificial dental structure is formed directly on existing dental structure that has been prepared for receipt of the restoration using additive manufacturing techniques and apparatuses.

The apparatuses disclosed herein are configured for in situ restoration of dental structure using an additive manufacturing device 34 (i.e., three-dimensional printer) that has a printer head 42 movable along three mutually perpendicular directions relative to a stationary portion or point on the additive manufacturing device. A dental composite resin is deposited directly on dental structure in the mouth of a patient from the printer head.

In certain embodiments, dental structure adjacent the dental structure on which the restoration is to be built is constrained to fix the position in space of the dental structure relative to the position of the base or frame of the additive manufacturing device 34 (i.e., three-dimensional printer). Constraint of the dental structure is achieved using a fixture that engages at least two opposing surfaces of the dental structure (e.g., teeth of a patient) adjacent the dental structure on which the restoration is to be built. These can, for example, be lingual surfaces on opposite sides of the patient's mouth, buccal surfaces on opposite sides of the patient's mouth, or a lingual surface and opposing buccal surface on one or both sides of the patient's mouth. Rigid structure is provided to hold the fixture in a fixed position relative to a stationary portion of the additive manufacturing device, such as the base, frame or housing 35 of the additive manufacturing device. For example, a boom or rigid support arm 43 can extend from a fixed building structure (e.g., a floor, wall or ceiling structure of a room of a building in which the restoration is performed), or from fixed apparatus structure such as the base, frame or housing of the additive manufacturing device 34.

Figure 1:
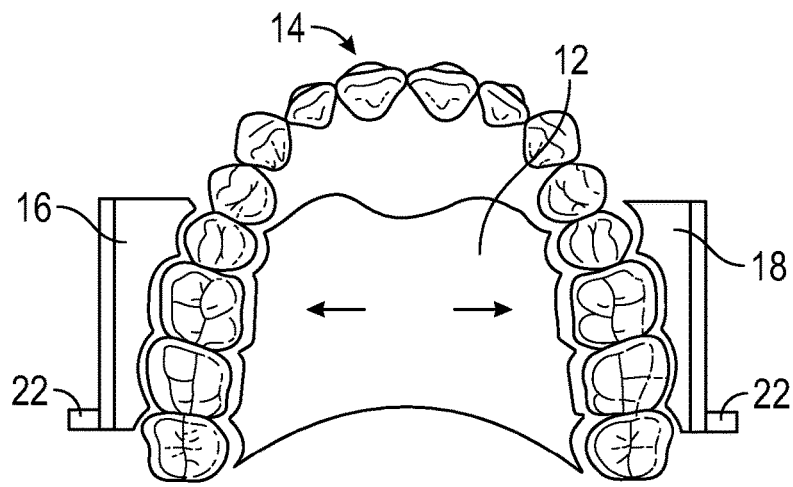
FIG. 1 is a top view of components of a fixture for maintaining the position of an additive manufacturing apparatus relative to teeth of a patient to achieve a dental restoration.
Figure 2A:
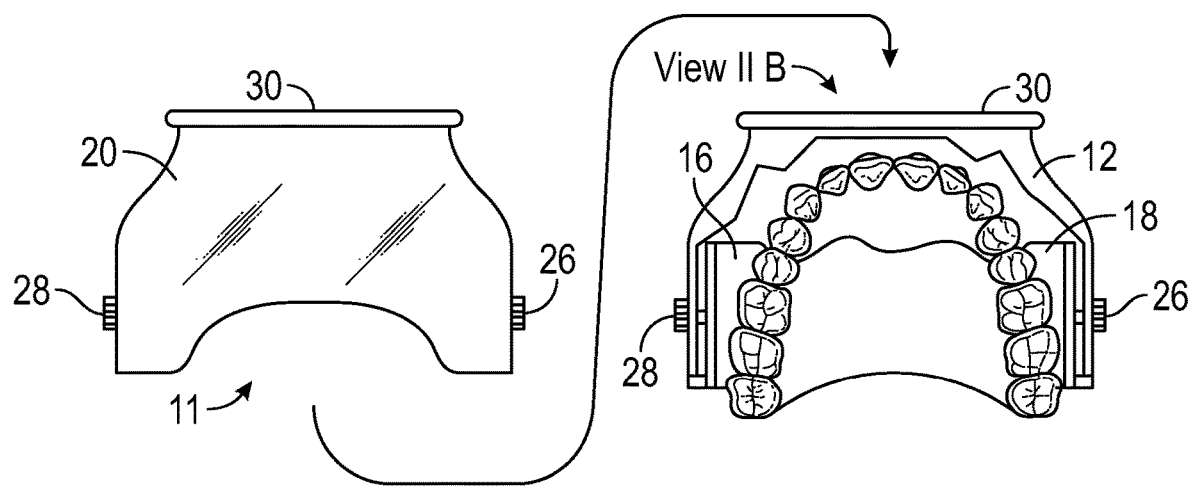
FIG. 2A is a top view showing assembly of the fixture on the teeth.
Figure 2B:
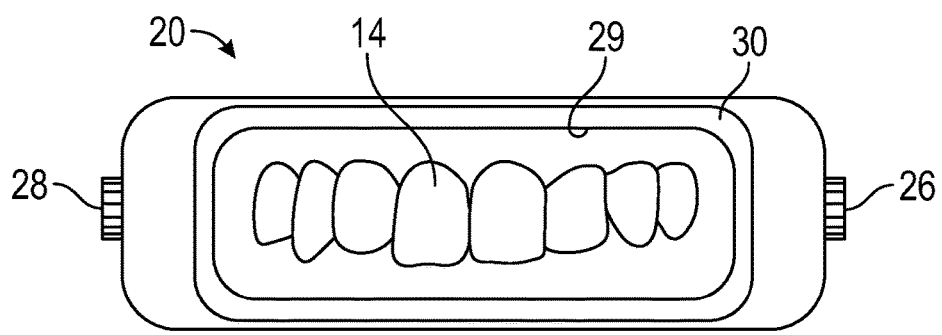
FIG. 2B is a front view of the fixture fully installed on the teeth.

An example of a fixture 11 for holding an additive fabricating machine in a fixed position relative to a mouth of a patient is shown in FIGS. 1, 2A and 2B. Fixture 11 includes a palate block 12 configured to engage lingual surfaces of a patient teeth 14. The palate block 12 is configured to conform very precisely to the lingual surfaces of the teeth 14 to resist rotational and linear movement with respect to the teeth when the fixture is fully installed. An adequately precise conformation of the surfaces of the palate block 12 with the lingual surfaces of the teeth 14 is one that prevents mispositioning of the tool head of an additive manufacturing machine by more than a desired or acceptable displacement relative to a desired or intended position of the tool head of the additive fabrication machine during the dental restoration process. Fixture 11 also includes buccal blocks 16, 18 that are configured to engage buccal or facial surfaces of teeth 14. Buccal blocks 16, 18 conform very precisely to the facial surfaces of teeth 14 to resist rotation and linear movement of the buccal blocks with the teeth when the fixture is fully installed. An adequately precise conformation of the surfaces of the buccal blocks with the teeth 14 is one that prevents unacceptable movement of the tool head of an additive manufacturing machine during the dental restoration process.

The palate block 12 and buccal blocks 16, 18 can be fabricated from plastic materials (e.g., acrylic or polycarbonate plastic blocks) that are milled to the required dimensions, which can be determined using a 3-D scanner that can analyze the dimensions of the tooth surfaces and generate a 3-D digital model of the tooth surfaces that are to be engaged by the buccal and palate blocks. A 3-D digital model of the buccal and palate blocks is then generated and used in a computer-aided milling process to produce the palate block 12 and buccal blocks 16, 18.

After the palate block 12 and buccal blocks 16, 18 have been fabricated and positioned in the mouth of the patient as shown in FIG. 1, a connector 20 can be used to lock the blocks 12, 16 and 18 in place, with the blocks conformingly engaged with the teeth, and with the connector 20 in a fixed position relative to blocks 12, 16 and 18 and teeth 14.

The buccal blocks 16, 18 can be provided with stops 22 on sides of the blocks opposite the sides engaging the facial surfaces of teeth 14. Stops 22, which may extend outwardly from blocks 16, 18 can be configured to engage a distal end (furthest from the lips) of the installed connector 20. Connector 20 is a hollow encasement having a distal open end that allows the connector to slide over the buccal blocks 16, 18, as illustrated in FIG. 2A. Fasteners, such as thumb screws 26, 28 can be provided to fix teeth 14, blocks 12, 16 and 18, and connector 20 in place so that there is no movement of the blocks 12, 16 and 18 or the connector 20 with respect to teeth 14.

A window 29 (shown in FIG. 2B) can be defined at the proximal or labial end of connector 20 to allow a tool head (e.g., a print head) of an additive fabricating machine to build structure on existing dental structure. In the illustrated embodiment, window 29 facilitates access to the incisors, canines and each of the first molars. However, various modifications are possible that would facilitate dental restorations using additive fabrication techniques on dental structure.

Figure 3A:
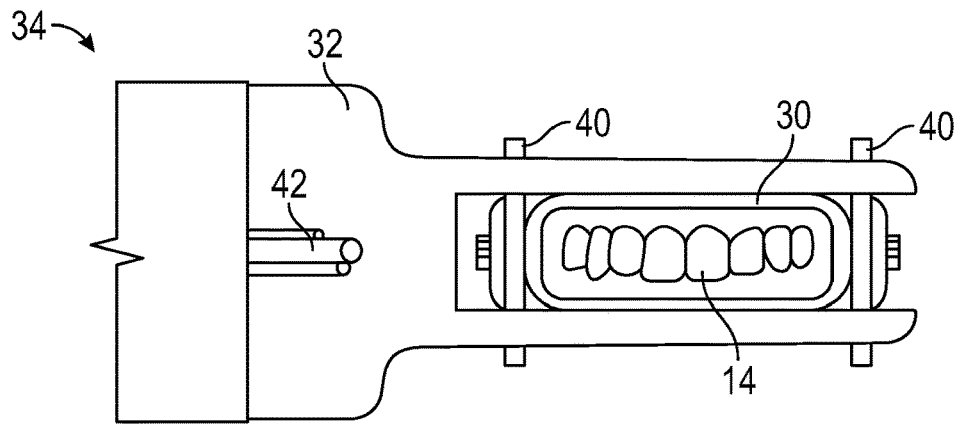
FIG. 3A is an illustration of an additive fabricating apparatus fixed in position relative to the teeth using the fixture illustrated in FIGS. 1, 2A and 2B.
Figure 3B:
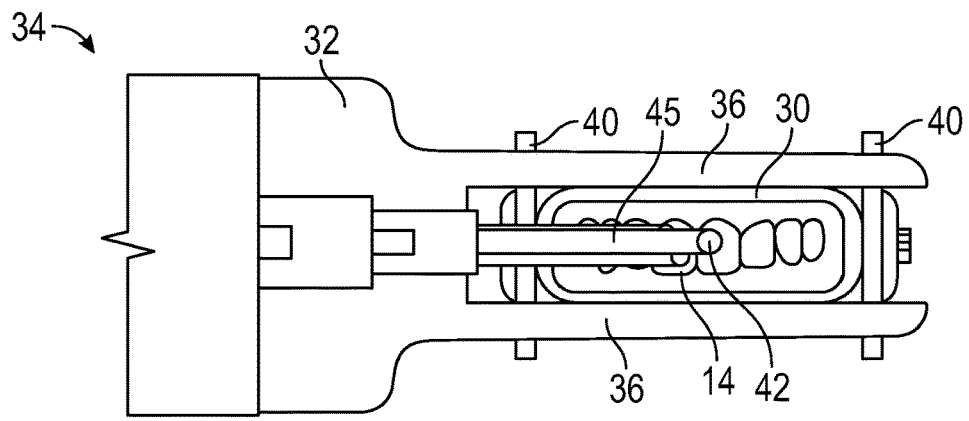
FIG. 3B is an illustration of the additive fabricating apparatus fixed in position relative to the teeth with the tool head of the additive fabricating apparatus positioned over the teeth for deposition of material to achieve the desired restoration.

In the illustrated embodiment, a flange 30 is defined at the distal end of connector 20 to facilitate positioning of a printer table 32 of an additive fabricating apparatus 34 (FIGS. 3A and 3B). The flange 30 is sized and shaped to fit exactly into grooves (not shown) provided in arms 36 that extend from printer table 32. In the illustrated embodiment, arms 36 are parallel and engage opposite edges of flange 30. Removable pins 40 can be used to firmly hold flange 30 in a fixed position relative to printer table 32 and additive manufacturing device 34. Screws, bolts, cotter pins or various other fastening means may be employed as a substitute for pins 40.

Additive fabricating apparatus 34 includes a printer head 42 that is movable in any direction (e.g., along three mutually perpendicular axes). As illustrated in FIG. 3B, printer head 42 is positional over teeth 14 to build layers of material on the existing dental structure as needed to complete a dental restoration in accordance with a planned structure.

Figure 4:
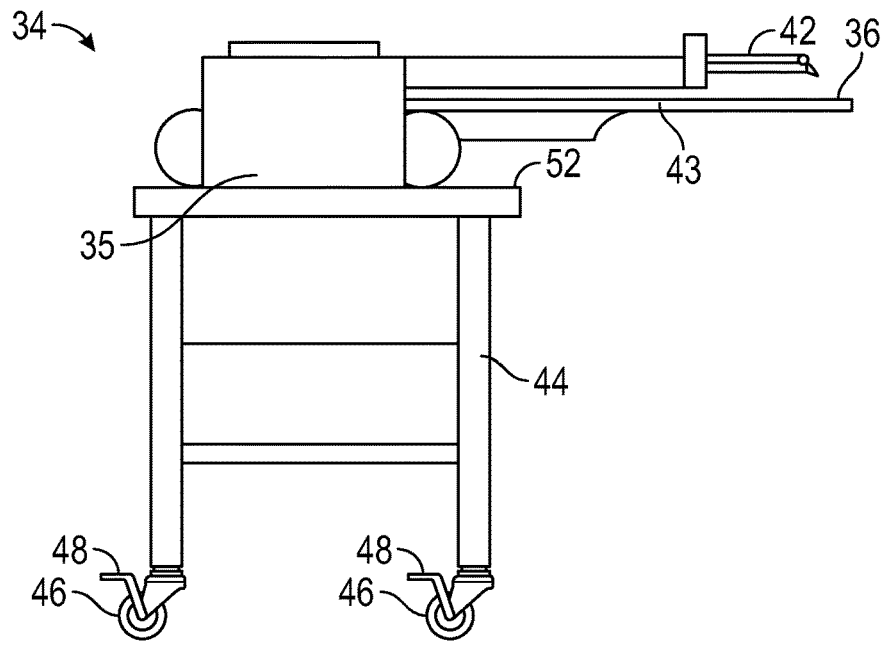
FIG. 4 shows a cart for supporting the additive fabricating apparatus during the dental restoration.

As illustrated in FIG. 4, the fabricating apparatus 34 can be supported on a cart 44 that allows the fabricating apparatus to be properly positioned relative to the patient during positioning of flange 30 between arms 36 of print table 32.

Figure 5:
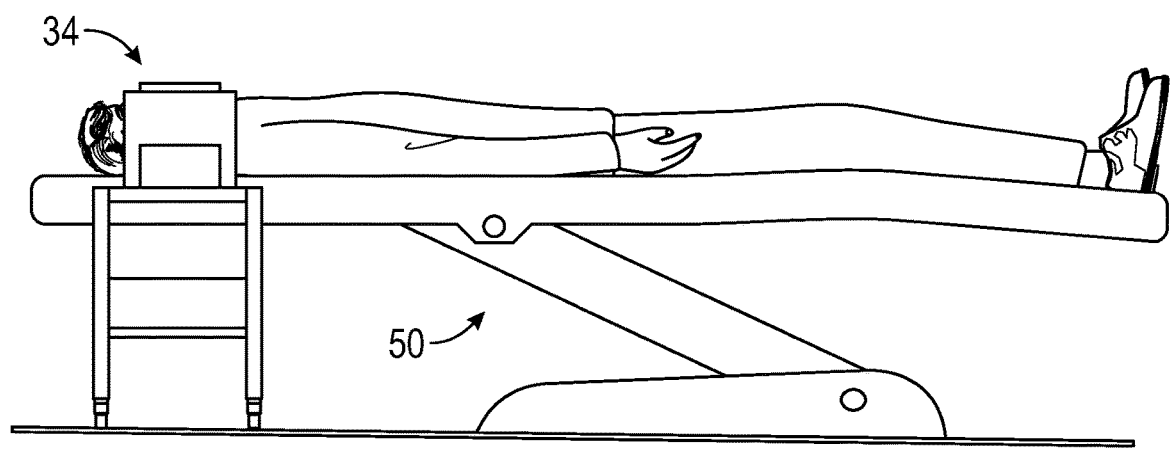
FIG. 5 is a side view of the additive fabricating apparatus and fixture fully positioned and ready for dental restoration of the teeth of a patient.
Figure 6:
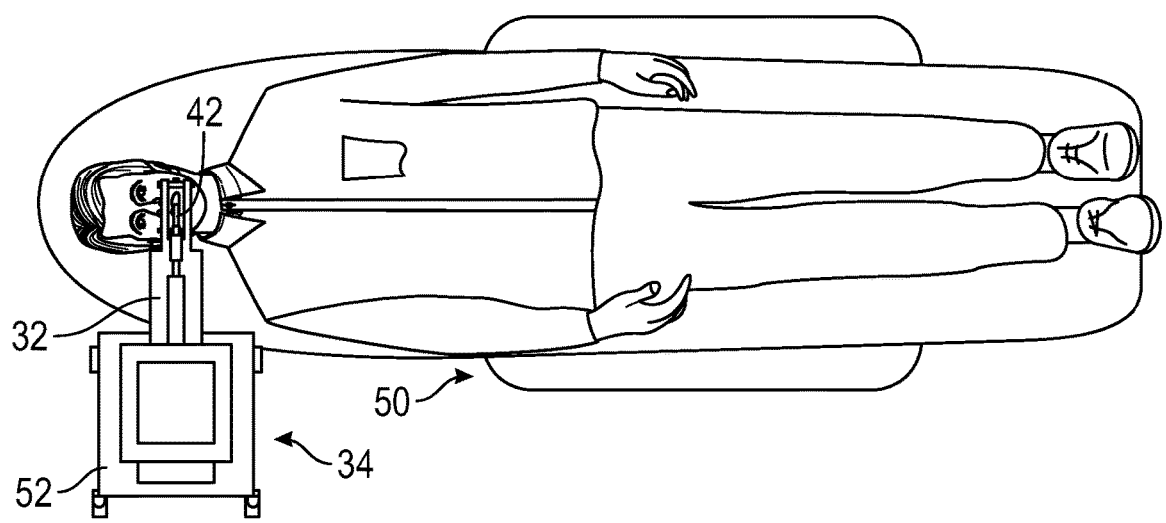
FIG. 6 is a top view of the apparatus and patient shown in FIG. 5.

Cart 44 can include wheels 46 that allows the cart to be easily rolled around and repositioned as needed as the additive fabricating apparatus 34 is being fixed into position relative to fixture 20 and therefore relative to teeth 14. Locks 48 can be included to lock wheels 46 in a fixed position to prevent movement of the fabricating apparatus 34 during the restoration, which in turn prevents movement of fixture 11 and the patient's mouth. The illustrated apparatus 34 and cart 44 can be used with a conventional dental chair 50, as illustrated in FIGS. 5 and 6. Dental chair 50 can be extended to or near a full back position, placing the patient in a horizontal position. Chair 50 can be raised or lowered as needed to adjust the height of flange 30 equal to the height of the grooves in arms 36. Alternatively, or in addition, cart 44 can be provided with height adjustment means (not shown) for raising the support surface 52 on which the apparatus 34 is supported.

Various conventional techniques may be employed for preparing the fixture used to position the teeth of a patient relative to an apparatus 34 for additive fabricating of dental structure. For example, optical digital scanning techniques (e.g., laser scanning) can be used for determining the conformational surface structure and dimensions needed for the fixture, and computer-aided manufacturing (CAD) techniques can be employed for fabricating a customized fixture for a patient. As another alternative, the fixtures can be molded by first taking impressions that are used to fabricate a mold. While the illustrated fixture is designed to facilitate dental restorations of incisors, canines, and first premolars, fixtures can be designed to facilitate dental restorations on generally any teeth, and multiple fixtures can be prepared to provide more extensive restorations.

Figure 7:
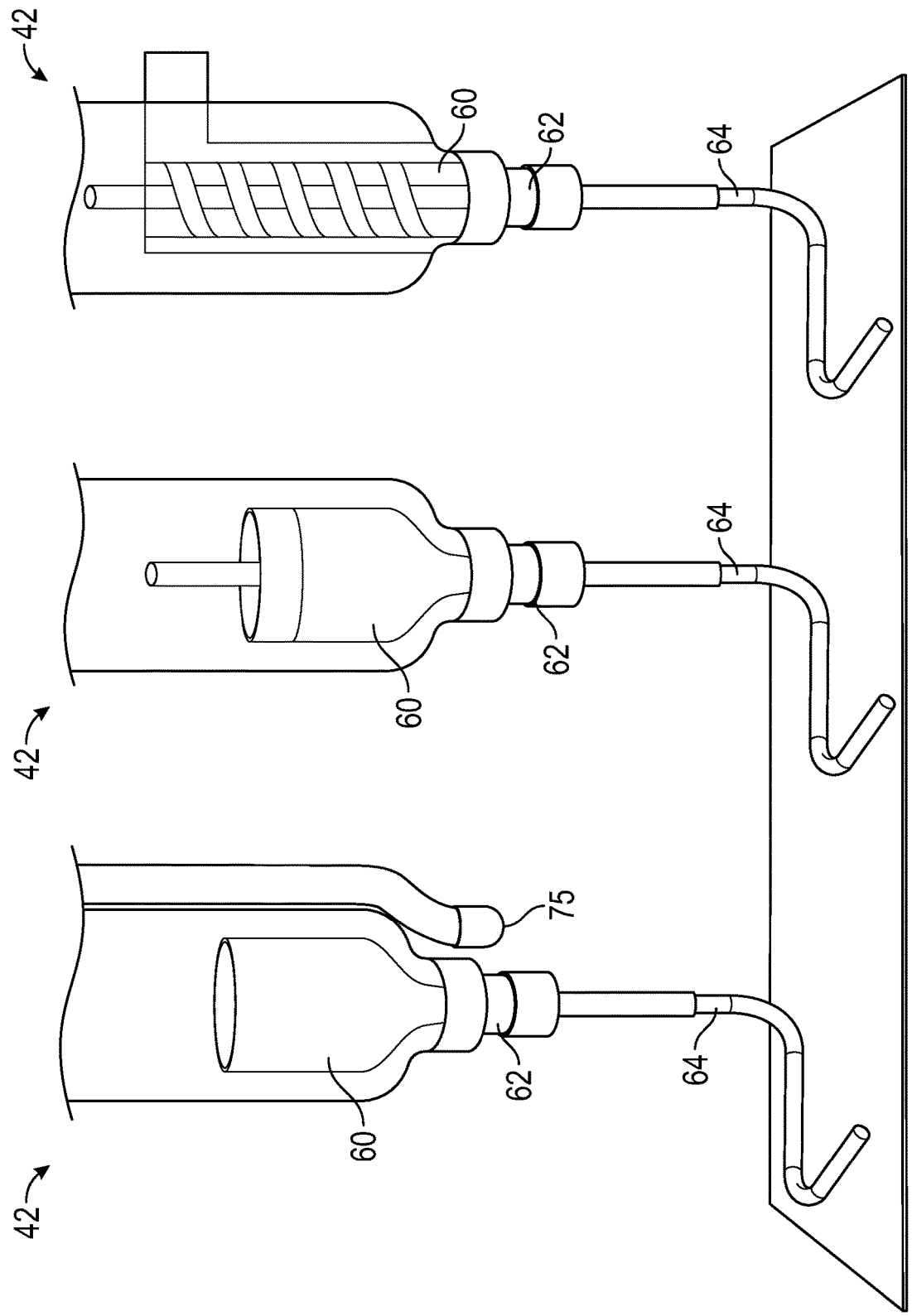
FIG. 7 is a schematic illustration of alternative printer heads usable with the disclosed apparatus.
Figure 8:
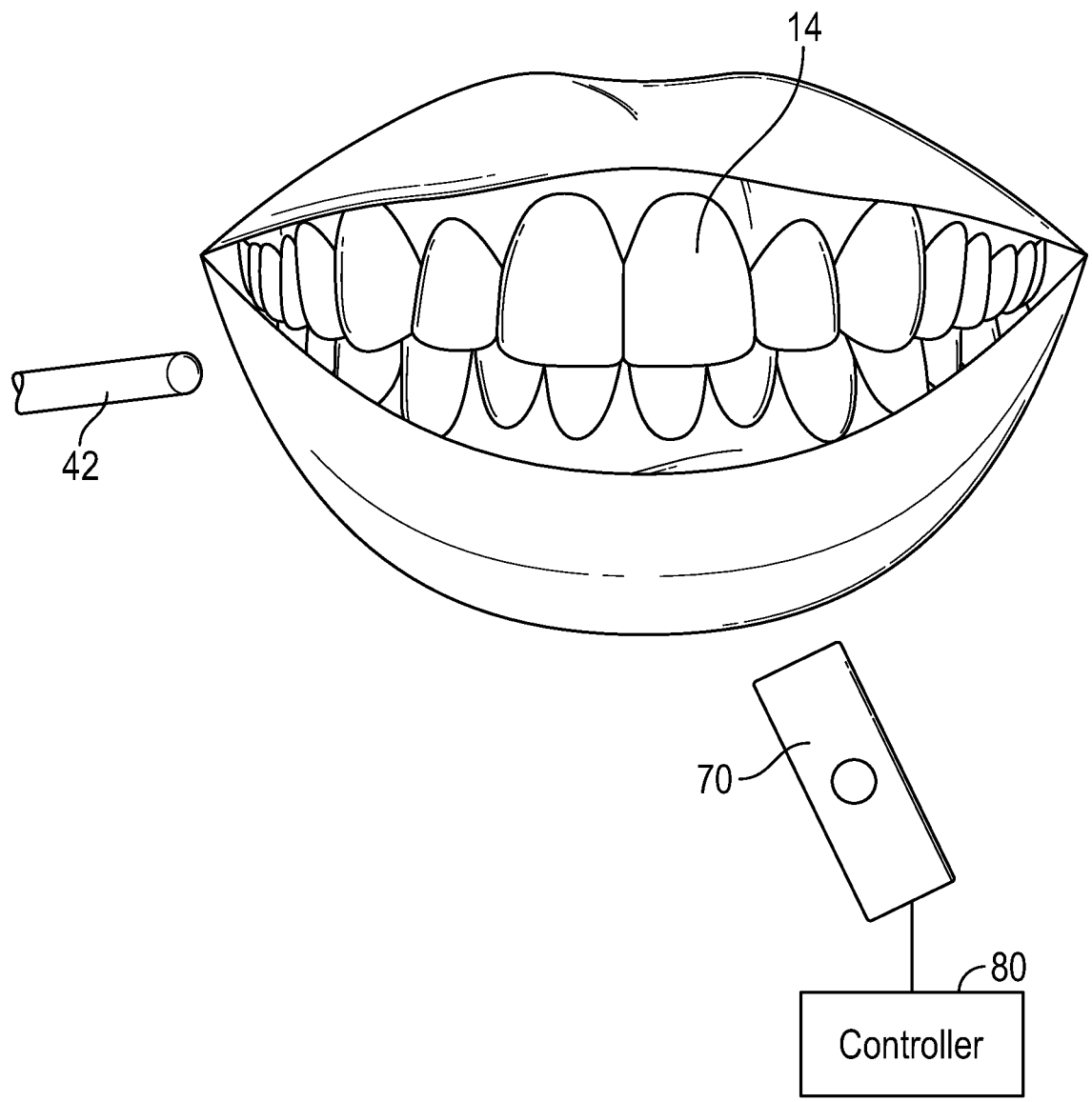
FIG. 8 is a schematic illustration of a sensor used in combination with an additive manufacturing device to facilitate dental restoration on unconstrained dental structure.

A receptacle (e.g., syringe 45) holding a dental composite resin can be sprayed, ejected or otherwise dispensed from the printer head 42. FIG. 7 is a schematic illustration of pneumatic, piston and screw printer apparatus having a receptacle holding a dental composite resin 60 and including a fluid connection 62 (a funnel shaped passage) from the receptacle to the nozzle 64 of the printer head 42.

Suitable dental composite resins include self-curing and photocurable liquid compositions comprising a resin-based oligomer, such as bisphenol A-glycidyl methacrylic (BIS-GMA), urethane dimethacrylate (UDMA) or semi-crystalline polyceram (PEX), and an inorganic filler, such as silicon dioxide. The dental composite resin may optionally include a silane coupling agent to enhance bonding between the resin and dental structure to which the resin is applied. The dental composite resin may optionally include an initiator, such as camphorquinone, phenylpropanedione or lucirin to promote rapid curing upon exposure to light of an appropriate wavelength (e.g., typically 400-500 nm). As another alternative, self-cure dental composite resins can be used. These typically require two parts that are maintained in separate liquid reservoirs, and employ a printer head that mixes the two parts at the nozzle.

The apparatus may include a light source 75 that emits light at a wavelength effective to initiate curing of a photocurable dental composite resin.

Before the fixture is prepared and installed, the teeth can be prepared for the dental restoration, such as by roughening surfaces of the teeth to promote bonding.

The desired or planned dental structure can be prepared by a dental professional using an optical scanner for developing a three-dimensional digital model of the dental structure that has been prepared for restoration, and using a dental computer-aided design/computer-aided manufacturing system (CAD/CAM) such as disclosed in U.S. Pat. No. 8,366,445, incorporated herein by reference.

In certain aspects of this disclosure, the apparatus for in situ restoration of dental structure includes a sensor 70 configured to detect a position and orientation of the dental structure and a controller 80 configured to determine a three-dimensional trajectory of the dental structure, control movement of the printer head to compensate for the trajectory of the unconstrained dental structure, and control deposition of the dental resin from the printer. The sensor and controller facilitate building of a dental restoration on unconstrained dental structure using an additive manufacturing device. This allows a patient on which the dental restoration is being performed to move their head slightly without interfering with the restoration. The controller is configured to collect data from the sensor to track the motion of the dental structure and to continue the restoration while compensating for movement of the dental structure. It is believed that patients would be more comfortable during the restoration procedure if they are allowed some freedom of head movement. During such procedure, it is contemplated that a mouth prop, bite block or other dental tool may be employed to make it easier for the patient to keep their mouth open to facilitate access to the dental structure on which the additive manufacturing device is depositing the dental composite resin. The sensor may, for example, be a three-dimensional optical scanner 70. Alternatively, the sensor can be a thermal sensor (e.g., infrared sensor).

The processes and apparatuses disclosed herein can be used to repair a fractured tooth, a decayed tooth, a worn tooth, a discolored tooth, a misshaped tooth or an improperly positioned tooth. These processes and apparatuses can also be used for repairing or renovating groups of teeth, such as adjacent front teeth for cosmetic smile enhancement, or for printing a bridge type restoration to replace a missing tooth.

The described embodiments are preferred and/or illustrated, but are not limiting. Various modifications are considered within the purview and scope of the appended claims.

What is claimed is:

1. An apparatus for in situ restoration of unconstrained dental structure, comprising:
    an additive manufacturing device having a printer head movable along three mutually perpendicular directions relative to a stationary portion of the device;
    a sensor configured to detect a position and orientation of the unconstrained dental structure;
    a receptacle holding a dental composite resin;
    a fluid connection for conveying the dental composite resin from the receptacle to the printer head; and
    a controller configured to determine a three-dimensional trajectory of the unconstrained dental structure, control movement of the printer head to compensate for the trajectory of the unconstrained dental structure, and control deposition of the dental resin from the printer head to build the planned restoration on the unconstrained dental structure.

2. The apparatus of claim 1, wherein the sensor is a three-dimensional optical scanner.

3. The apparatus of claim 1, wherein the sensor is an infrared scanner.

4. The apparatus of claim 1, wherein the dental composite resin is a self-curing composition.

5. The apparatus of claim 1, wherein the dental composite resin is a photocurable composition.

6. The apparatus of claim 5, further comprising a light source for initiating cure of the dental composite resin.

7. The apparatus of claim 1, wherein the dental composition comprises a resin-based oligomer and an inorganic filler.

8. The apparatus of claim 7, wherein the resin based oligomer is bisphenol A-glycidyl methacrylate, urethane dimethacrylate, or semi-crystalline polyceram.

9. The apparatus of claim 8, wherein the inorganic filler is silicon dioxide.

10. The apparatus of claim 7, wherein the dental composition further comprises an initiator selected from camphorquinone, phenylpropanedione and lucirin.

11. An apparatus for in situ restoration of dental structure, comprising:
   an additive manufacturing device having a printer head movable along three mutually perpendicular directions relative to a stationary portion of the device;
   a receptacle holding a dental composite resin;
   a fluid connection for conveying the dental composite resin from the receptacle to the printer head;
   a fixture configured for engaging at least two opposing surfaces of dental structure adjacent a portion of the dental structure on which a restoration is to be built; and
   rigid structure holding the fixture in a fixed position relative to the stationary portion of the additive manufacturing device.

12. The apparatus of claim 11, wherein the dental composite resin is a self-curing composition.

13. The apparatus of claim 11, wherein the dental composite resin is a photocurable composition.

14. The apparatus of claim 13, further comprising a light source for initiating cure of the dental composite resin.

15. The apparatus of claim 11, wherein the dental composition comprises a resin-based oligomer and an inorganic filler.

16. The apparatus of claim 15, wherein the resin based oligomer is bisphenol A-glycidyl methacrylate, urethane dimethacrylate, or semi-crystalline polyceram.

17. The apparatus of claim 16, wherein the inorganic filler is silicon dioxide.

18. The apparatus of claim 15, wherein the dental composition further comprises an initiator selected from camphorquinone, phenylpropanedione and lucirin.

* * * * *